Dec. 7, 1943. C. W. PETERSON 2,336,288
STEREO VIEWING DEVICE
Filed June 12, 1940 2 Sheets-Sheet 1

CHARLES W. PETERSON
INVENTOR
BY *Newton M. Perrines*
*J. Griffin Little*
ATTORNEYS Dec. 7, 1943.   C. W. PETERSON   2,336,288
STEREO VIEWING DEVICE
Filed June 12, 1940   2 Sheets-Sheet 2
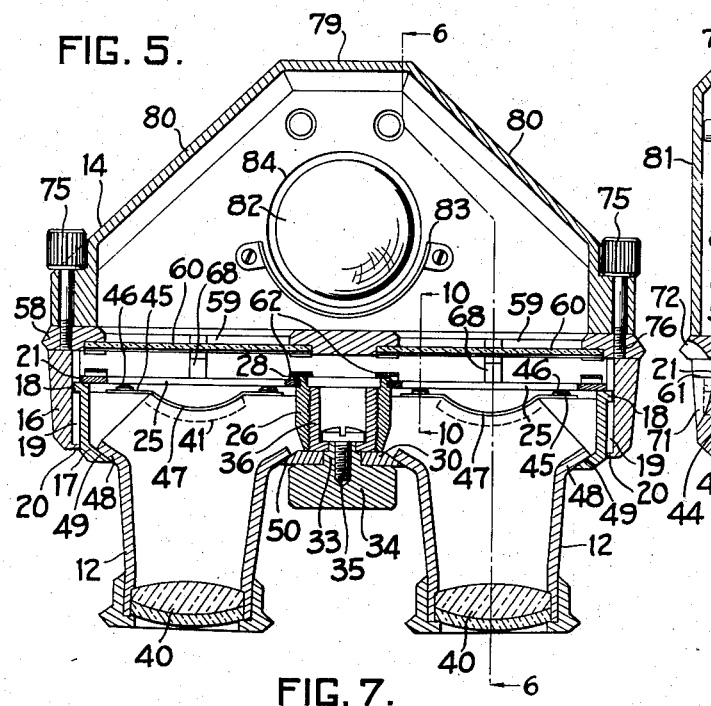
CHARLES W. PETERSON
INVENTOR
BY
ATTORNEYS Patented Dec. 7, 1943

2,336,288

UNITED STATES PATENT OFFICE 2,336,288

STEREO VIEWING DEVICE

Charles W. Peterson, Rochester, N. Y., assignor to Eastman Kodak Company, Rochester, N. Y., a corporation of New Jersey Application June 12, 1940, Serial No. 340,142

13 Claims. (Cl. 88—29)

The present invention relates to viewing devices, and more particularly to a device of this class adapted for viewing a pair of stereoscopic images.

One object of the invention is the provision of an arrangement for pivotally mounting the viewing lens tubes for movement about axes which lie substantially in the plane of the stereo slide for adjusting the interocular spacing of the viewing lens tubes.

Another object of the invention is the provision of a simple, yet highly effective arrangement for operatively connecting the viewing lens tubes so that the lateral movement of either of the tubes will automatically and simultaneously move the other tubes an equal amount and in the proper direction so as to secure the desired spacing of the tubes.

A further object of the invention is the provision of an arrangement for partially ejecting the slides to facilitate the removal thereof from viewing position.

Still another object of the invention is the provision of a lamphouse in which a lamp is mounted on a detachable handle or support to facilitate the replacement of said lamp.

To these and other ends, the invention resides in certain improvements and combinations of parts all as will be hereinafter more fully described, the novel features being pointed out in the claims at the end of the specification.

In the drawings:

Fig. 5 is a horizontal sectional view taken through the viewing device and the lamphouse;

Fig. 6 is a vertical sectional view through the device illustrated in Fig. 5, and taken substantially on line 6—6 thereof, showing the arrangement of the various parts;

Fig. 7 is a plan view of the pair of viewing lens tubes detached from the viewing device, showing the unique single tooth arrangement for operatively connecting the two lens tubes;

Fig. 8 is a front elevation view of the lens tubes and the connecting tooth construction illustrated in Fig. 7;

Fig. 9 is a view similar to Fig. 4, but with the slide inserted in position for viewing; and Fig. 10 is a fragmentary sectional view through a portion of the viewing device taken substantially on the line 10—10 of Fig. 5, showing the relation of the two telescopic members and their connecting plate.

Similar reference numerals throughout the various views indicate the same parts.

Figure 1:
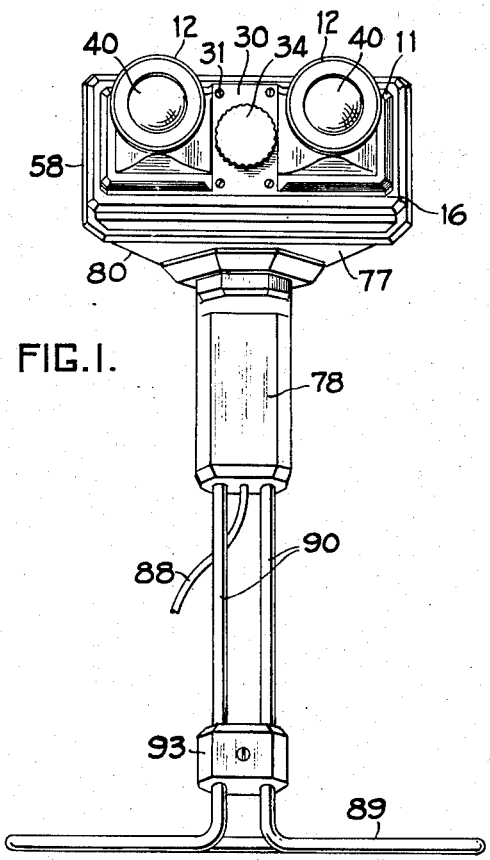
Fig. 1 is a front elevation view of a stereoscopic viewing device constructed in accordance with the present invention, showing the device mounted on a supporting bracket or stand.
Figure 2:
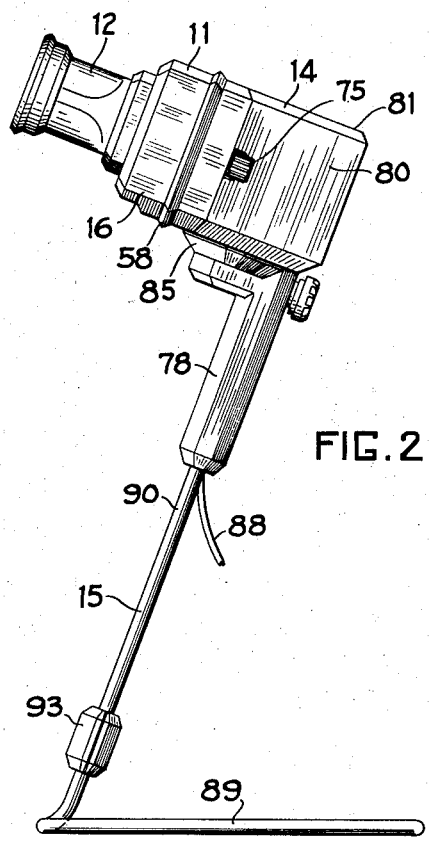
Fig. 2 is a side elevation view of the device and the supporting bracket illustrated in Fig. 1.

The present invention is embodied in the present instance, by way of illustration, in a stereo viewing device which comprises broadly a slide holder 11, a pair of viewing lens tubes 12 operatively connected to the holder and through which the images on a stereo slide 13 may be viewed, a lamphouse 14 detachably secured to the holder 11 for illuminating the images of the slide 13, and a supporting base or bracket 15. The holder 11 comprises, in the present embodiment, a pair of hollow rectangular members 16 and 17 which are slidably connected for telescopic adjustment, as shown in Fig. 5 and later described. A pair of laterally extending lugs 18 on the inner member 17 slide in grooves or slots 19 in the outer member 16, as shown in Fig. 5. One end of each of these slots is closed by a shoulder at 20, Fig. 5, to limit the outward movement of the member 17 relative to the member 16. A plate 21 rests on and is secured by screws 22 to a pair of shoulders or abutments 23 arranged along opposite inner surfaces of the member 16 and positioned below the front or top edge 24 of the member 16, as best shown in Fig. 10.

The plate 21 is formed with a pair of spaced apertures 25 which frame the two spaced stereoscopic images on the slide 13. An internally threaded sleeve 26 extends through a registering opening in the plate 21 and has the ends riveted over thereon, as shown at 28, Fig. 5, to rigidly secure the sleeve 26 to the plate 21. A closure plate 30 is secured by screws 31 to the front of the member 17 and is formed with an opening through which a portion 33 of a focusing knob 34 extends. A stud 35 operatively connects the portion 33 with a second externally threaded sleeve 36 positioned within and threadably engages the sleeve 26, as shown in Fig. 5. As the plate 21 is rigidly fixed to the member 16, it will be apparent that rotation of the knob 34 will rotate the sleeve 36 within the stationary sleeve 26 to slidably move the members 16 and 17 in a telescopic relation to focus the lens tubes 12 which are secured to the member 17 in a manner to be presently described.

The two lens tubes 12 are of identical construction so that only one will be described in detail, the corresponding parts of the other lens tube being designated by the same numerals. Each tube is of the shape best shown in Figs. 7 and 8, and is provided with a suitable viewing lens 40 at the viewing end, see Fig. 5. Each tube is formed with an upper and a lower arcuate lug 41 and 42 which are slidably mounted in similar concentric recesses 43 formed in the edge 44 of the member 17. Springs 45 have the ends thereof secured by screws 46 on the edge 44 and has intermediate portions 47 formed to conform with the curvature of the lugs 41 and 42 to positively retain the latter in the recesses 43, as will be apparent from an inspection of Figs. 5 and 9. By means of this arrangement each lens tube is pivotally mounted for lateral movement on the member 17, the center of curvature of the lugs 41 and 42 being substantially in the plane of the slide 13 so that the point of pivot for each tube 12 is substantially in the plane of the slide, the advantages of which are apparent to those in the art. When the lugs 41 and 42 are retained in the recesses 43 by the springs 45, the flared portions 48 thereof engage similar shaped shoulders or abutments 49 and 50 formed on the member 17 and the closure plate 30, see Fig. 5, to mount the lens tubes in fixed axial relation on the member 17. The lens tubes 12 thus move axially as a unit with the member 17 when the knob 34 is rotated so as to adjust the lenses 40 towards or away from the images on the slide 13 to secure the desired focusing of the lenses 40, as will be apparent.

The pivotal mounting of the tubes 12 on the member 17 permit the tubes to be adjusted laterally relative to each other to secure the desired interocular spacing suitable to the user. During the latter adjusting, the lugs 41 and 42 slide along the recesses 43 and the flared portions 48 slidably engage the shoulders 49 and 50. The tube 12 thus has two adjustments, one toward and away from the slide 13 to secure the proper focusing, and second, laterally relative to each other and the member 17 to secure the proper interocular spacing. It is contemplated that each lens tube may be separately and independently adjusted laterally, but it is preferred to operatively connect the tubes so that any lateral movement of either of the tubes will be automatically and simultaneously transmitted to the other tube to move the latter the proper distance and direction to secure the desired spacing of the tubes.

To this end, the present invention provides a novel, simple, yet highly effective connection between the tubes 12. Referring now to Figs. 7 and 8, it will be apparent that each tube 12 is provided with a pair of inwardly projecting teeth or lugs 52 and 53 which form extensions of the upper and lower edges 54 and 55 respectively of the tubes 12. Each of these lugs is adapted to engage, in overlapping relation, a complementary lug or tooth on the other tube to operatively connect the tubes for unitary and simultaneous lateral adjustment. In order that this two-tooth connection may be utilized to adjust both tubes simultaneously regardless of which one is actuated, the overlapping relation of the upper and lower pairs of teeth are reversed. In other words, the upper tooth 52 of the left tube 12, Fig. 7, is positioned behind the upper tooth 52 of the right tube 12, as clearly shown in Fig. 7. The lower tooth 53 of the left tube 12, is, however, positioned ahead of the lower tooth 53 of the right tube, as indicated in Fig. 8. By means of this arrangement, the leftward movement of the left tube 12 will bring the upper tooth 52 into engagement with the upper tooth 52 of the right tube to move the latter to the right to separate the tubes. However, the rightward movement of the left tube 12 will bring the lower tooth 53 into engagement with the similar lower tooth 53 on the right tube to move the latter to the left, to bring the two tubes toward each other. Thus any movement of either tube will simultaneously move the other tube an equal amount and in the proper direction. It is apparent that during such lateral adjustment only a single tooth on one of the tubes engages and actuates a single tooth on the other tube to secure the desired simultaneous tube adjustment.

Figure 4:
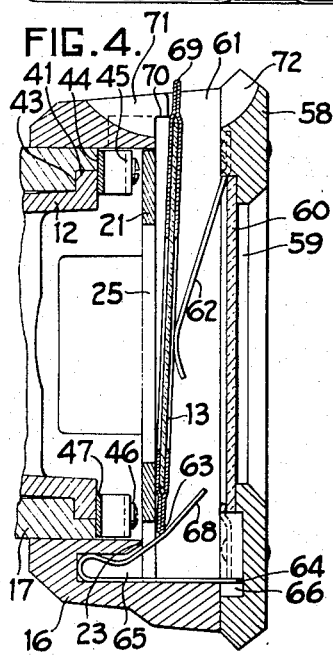
Fig. 4 is a vertical sectional view through the viewing device, with the lamphouse removed, and taken along a portion of line 6—6 of Fig. 5, showing the stereo slide partially inserted in the device, or the position the slide will occupy when partially ejected.
Figure 3:
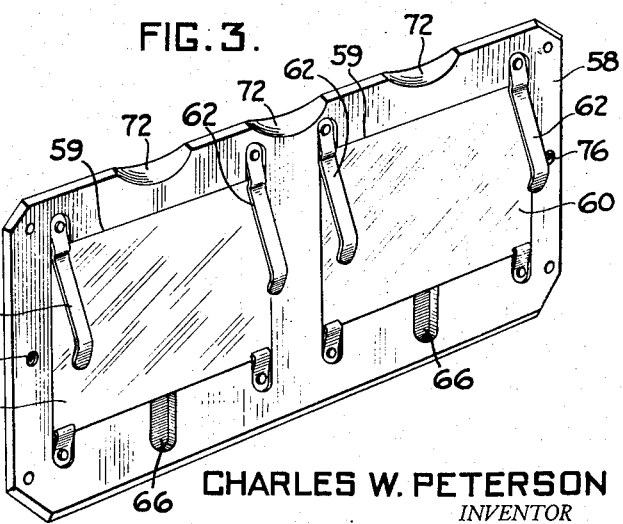
Fig. 3 is a perspective view of the cover plate with its light diffusing glass, and the springs for retaining the slide in proper viewing position, as shown in Fig. 9.

The open end of the member 16 is closed by a cover plate 58 which is formed with apertures 59 arranged in alignment with the images of the slide 13 and the apertures 25 of the plate 21. Light diffusing members 60 such as ground or frosted glass, are positioned over the apertures 59 to suitably diffuse the light falling on the stereo images. A top opening slot 61 is formed in the member 16 between the plate 21 and the cover plate 58, as best shown in Figs. 4 and 9. The slide 13 is inserted through this slot, see Fig. 4, and is engaged by springs 62 on the cover plate 58 to urge the slide toward and into engagement with the plate 21, as clearly shown in Fig. 9. As the slide is thus inserted, the lower edge 63 thereof engages V-shaped springs 64 positioned in the bottom of the slot 61 and retained in position therein by aligned recesses 65 and 66 in the members 16 and the cover plate 58, see Fig. 4. The springs 64 are formed with an inclined or cam-like portion 68 which, when the lower end 63 of the slide engages therewith, cams or moves the slide toward the plate 21, the spring 62 cooperating in said positioning movement. When the slide has been inserted the proper distance in the slot 61, the upper end 69 is moved to the left, as viewed in Figs. 4 and 9, to bring the upper end behind or under the retaining shoulder 70 formed on the member 17 adjacent the top of the slot 61.

The slide is thus securely held in position between the springs 64 and the shoulder 70 to position the image areas of the slide in registry with the apertures 25 and 59 of the plates 21 and 58, as clearly shown in Fig. 9. When, however, the slides are to be removed, the top 69 of the slide is tilted to the right, as viewed in Fig. 9, to disengage the slide from the shoulder 70. The springs 64 then flex upwardly to the position shown in Fig. 4 to partially eject the slide through the slot 61 to a position where it may be grasped by the user and removed, thus materially facilitating the removal of the slide. To further assist such removal, the member 16 and the cover plate 58 adjacent the slot 61 are formed with aligned curved or cut away finger recesses 71 and 72 respectively.

If natural light is available, the above described device can be used without any lamphouse 14. In such a case, the device is directed toward the light source and is used much in the manner of a pair of binoculars. The light rays are then diffused by the ground glasses 60 and sufficiently illuminate the two stereo images so that the latter may be stereoscopically viewed through the two lens tubes to secure the desired third dimensional effect. If desired, however, the lamphouse may be used merely by securing the lamphouse to the cover plate 58 by means of thumb screws 75 which are carried by the lamphouse and arranged to threadably engage registering openings 76 in the cover plate 58, see Fig. 5.

The lamphouse is formed with a bottom 77 from which depends a handle 78 by which the entire viewing device may be held in the hand. The lamphouse also comprises a back 79, inclined sides 80, and a top 81 all of which cooperate with the bottom 77 to form an enclosure for a light source or lamp 82. A shield 83 is positioned between the lamp 82 and the cover plate 58 to direct the rays of the lamp onto the inclined sides 80 from whence they are directed through the diffusing glasses 60 to the spaced stereo images on the slide 13. The slides 80 may have secured thereto suitable reflecting members, such as mirrors, but it has been found that sufficient reflection can be secured merely by coating the inside of a lamphouse with a suitable reflecting paint.

In order to permit the ready and easy replacement of the lamp 82 without necessitating detachment of the lamphouse 14 from the holder 11, the lamp 82 is preferably mounted on the upper end of the handle 78 and projects through an opening 84 in the bottom 77 of the lamphouse. The handle 78 is, in turn, detachably secured to the lamphouse bottom 77 so that the handle and lamp may be easily disconnected from the lamphouse. To secure this result, the handle 78 is formed with a flange 85 arranged to engage the under side 86 of the bottom 77 and to be detachably secured thereto by screws or other suitable fastening means. A suitable electric cord passes through the handle 78 and connects the lamp 82 to a suitable source of electric current.

The handle 78 thus affords a means by which the viewing device may be held in the hand. If, however, a more permanent or more rigid support is desired, the handle 78 may be secured to the supporting base or bracket 15. The latter may be formed from a single piece of rod to provide a circular or suitable shaped horizontal portion 89 adapted to be positioned on a table or suitable object, and a pair of upwardly extending spaced members 90 which are adapted to be slidably received in longitudinal extending slots 91 formed in the handle 78. By sliding the handle 78 along the members 90, the vertical position of the viewer may be adjusted. The members 90 are adapted to extend through registering openings 92 in the bottom 77 of the lamphouse and to engage the top 81 which limits the downward adjustment of the device, as will be apparent from inspection of Fig. 6. The members 90 are preferably slightly bowed to afford the desired resiliency. To adjust the device, the members 90 are grasped and pressed towards each other. The handle 78 is then slid upwardly or downwardly until the desired adjustment is secured, after which the members 90 are released to resiliently grip the sides of the slots 91 to frictionally retain the device in adjusted position. A lug 93 connects the member 90 adjacent the lower end thereof to retain the members in proper spaced relation, as clearly illustrated in Fig. 1.

It is thus apparent that the present invention provides a simple, unique, and highly effective means for pivotally mounting the viewing lens tube for movement about axes which lie substantially in the plane of the stereo slide. The invention also provides a novel arrangement for operatively connecting the lens tubes so that movement of either tube will automatically and simultaneously move the other tube the proper amount and direction to secure the desired interocular spacing of the tubes. In addition, a device is provided for partially ejecting the slides so that the latter may be readily removed from the viewing device. Finally, the detachable lamphouse is formed with a removable handle on which the lamp is mounted so that the latter may be replaced without necessitating the detachment of the lamphouse from the holder 11.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:

1. In a stereo viewing device comprising, in combination, a pair of telescopically slidable members, means on one of said members for mounting a stereo slide on which are positioned in a fixed plane a pair of spaced stereo images, a pair of viewing lens tubes arranged in alignment with said images, means for securing said tubes to the other of said members, means for adjustably connecting said members for moving said lens tubes and said other member axially relative to said slide for focusing, and means for independently pivotally mounting said tubes on said other member for movement about separate axes substantially in the plane and at the centers of said images so that said tubes may be moved laterally relative to said other member to adjust the spacing of said tubes.

2. In a stereo viewing device comprising, in combination, a pair of telescopically slidable members, means on one of said members for mounting a stereo slide on which are positioned in a fixed plane a pair of spaced stereo images, a pair of viewing lens tubes arranged in alignment with said images, means for securing said tubes to the other of said members, means for adjustably connecting said members for moving said lens tubes and said other member axially relative to said slide for focusing, means for independently pivotally mounted said tubes on said other member so that said tubes may be moved laterally relative to said other member about separate axes at the centers of said images to adjust the spacing of said tubes, and means for connecting said tubes adjacent said slide so that lateral movement of one of said tubes will automatically adjust the other tube the proper distance and in the required direction.

3. In a stereo viewing device comprising, in combination, a pair of telescopically slidable members, means on one of said members for mounting a stereo slide on which are positioned a pair of spaced stereo images, a pair of viewing lens tubes arranged in alignment with said images, means for securing said tubes to the other of said members, means for adjustably connecting said members for moving said lens tubes and said other member axially relative to said slide for focusing, an arcuate lug formed on each of said tubes adjacent said slide, said other member being formed with arcuate recesses adapted to slidably receive said lugs to pivotally mount said tubes for lateral adjustment on said other member, springs secured to said other member and engaging said lugs to retain the latter in said recesses, and shoulders on said other members cooperating with said springs for securing said tubes to said other member.

4. In a stereo viewing device comprising, in combination, a pair of telescopically slidable members, means on one of said members for mounting a stereo slide on which are positioned a pair of spaced stereo images, a pair of viewing lens tubes arranged in alignment with said images, means for securing said tubes to the other of said members, means for adjustably connecting said members for moving said lens tubes and said other member axially relative to said slide for focusing, an arcuate lug formed on each of said tubes adjacent said slide, said other member being formed with arcuate recesses adapted to slidably receive said lugs to pivotally mount said tubes for lateral adjustment on said other member, springs secured to said other member and engaging said lugs to retain the latter in said recesses, shoulders on said other member cooperating with said springs for securing said tubes to said other member, and a single tooth projecting laterally from one of said tubes adjacent said lug and engaging a similar single tooth on the other tube to operatively connect said tubes whereby when one of said tubes is pivoted on said other member the other tube will be automatically moved the proper distance and direction to space the viewing ends of said tubes.

5. In a stereo viewing device comprising, in combination, a pair of telescopically slidable members, means on one of said members for mounting a stereo slide on which are positioned a pair of spaced stereo images, a pair of viewing lens tubes arranged in alignment with said images, means for securing said tubes to the other of said members, means for adjustably connecting said members for moving said lens tubes and said other member axially relative to said slide for focusing, an arcuate lug formed on each of said tubes adjacent said slide, said other member being formed with arcuate recesses adapted to slidably receive said lugs to pivotally mount said tubes for lateral adjustment on said other member, springs secured to said other member and engaging said lugs to retain the latter in said recesses, shoulders on said other member cooperating with said springs for securing said tubes to said other member, and an upper and a lower tooth projecting from each of said tubes adjacent said lugs and arranged to engage in overlapping relation the cooperating tooth of the other tube to operatively connect said tubes adjacent said slide, the overlapping relation of the upper and lower engaging tooth being reversed so that the lateral movement of either tube will be automatically transmitted to the other tube to simultaneously move the latter laterally the proper distance and direction to secure the desired interocular spacing of said tubes.

6. In a stereo viewing device comprising, in combination, a support, a pair of viewing lens tubes mounted on said support, said support being formed with a slot adapted to receive a stereo slide on which are positioned a pair of spaced stereo images, holding means on said support for retaining said images in alignment with said tubes, flexible means engaging an edge of said slide and adapted to partially eject said slide from said slot when said slide is moved away from said holding means to facilitate removal of said slide from said slot, and an inclined portion on said flexible means engageable by said edge when said slide is positioned in said slot to move said slide into alignment with said holding means.

7. In a stereo viewing device comprising, in combination, a support, a pair of viewing lens tubes mounted on said support, said support being formed with a slot adapted to receive a stereo slide on which are positioned a pair of spaced stereo images, a spring positioned in the bottom of said slot and arranged to be compressed by the insertion of a slide, a fixed shoulder on said support adjacent the top thereof arranged to engage an edge of said slide and to cooperate with said spring to retain said images in alignment with said tubes, and a cam formed on said spring and engageable by said slide when the latter is inserted in said slot to move said slide out of registry with said slot and into alignment with said shoulder, said spring serving to partially eject said slide from said slot when the slide is moved away from said shoulder to facilitate removal of said slide.

8. In a stereo viewing device comprising, in combination, a support, a pair of viewing lens tubes mounted on said support, a plate secured to said support and formed with spaced apertures arranged in alignment with said tubes, said support being formed with a slot adapted to receive a slide on which are positioned a pair of spaced stereo images, a spring positioned in said slot and arranged to be engaged by the lower edge of said slide to guide the latter toward said plate, and a shoulder on said support cooperating with said spring to retain said images in registry with the apertures of said plate, said spring serving to partially eject said slide from said slot when said slide is moved away from said shoulder so as to facilitate removal of said slide.

9. In a stereo viewing device comprising, in combination, a holder for a slide on which are positioned a pair of spaced stereo transparencies, a pair of viewing lens tubes secured to said holder on one side of said slide and arranged in alignment with said transparencies, a lamphouse detachably secured to said holder on the other side of said slide and arranged to direct light rays through said transparencies, a supporting member detachably secured to said lamphouse, and a lamp mounted on said supporting member and positioned in said lamphouse to afford a source of illumination for said transparencies, said lamp being removable as a unit with said supporting member when the latter is detached from said lamphouse.

10. In a stereo viewing device comprising, in combination, a holder for a slide on which are positioned a pair of spaced stereo transparencies, a pair of viewing members secured to said holder on one side of said slide and arranged in alignment with said transparencies, a lamphouse detachably secured to said holder on the other side of said slide, light reflecting members on said lamphouse arranged in alignment with said transparencies and adapted to reflect light rays therethrough, a supporting member detachably secured to said lamp house, a lamp mounted on the end of said supporting member and positioned in said lamphouse intermediate said reflecting members, and a shield mounted in said lamphouse for directing the light rays of said lamp onto said reflecting members.

11. In a stereo viewing device comprising, in combination, a holder for a slide on which are positioned in a fixed plane a pair of spaced stereo transparencies, a pair of viewing lens tubes secured to said holder on one side of said slide and arranged in alignment with said transparencies, cooperating portions on said tubes and said holder adjacent said slide for pivotally mounting said tubes for lateral adjustment about axes substantially in the plane of said slide and at the centers of said images to vary the spacing between the viewing ends of said tubes, and means formed integral with said tubes and positioned adjacent said portions for directly connecting said tubes so that lateral movement of one of said tubes will automatically move the other of said tubes the proper distance and direction.

12. In an apparatus for stereoscopically viewing stereoscopic film negatives having adjoining edges, a base, means on said base for placing thereupon said film negatives in position to be viewed, an optical system for stereoscopically viewing said film negatives comprising a pair of optical image forming elements, fixed means on said base for supporting said elements in viewing relation to said film negatives with the lower ends of the optical axes thereof passing through the centers of the adjoining film negatives, the upper ends of said optical axes being angularly adjustable with respect to said centers and means for adjusting the upper ends of said optical axes whereby to adjust said optical axes to suit the spacing of the eyes of an observer.

13. In an apparatus for stereoscopically viewing a pair of stereoscopic transparencies, a continuous supporting member adapted to hold said transparencies in position in a plane to be viewed, an optical system for stereoscopically viewing said transparencies comprising a pair of optical image-forming elements, means on said supporting member for supporting said elements in viewing relation to said transparencies with the lower ends of the optical axes thereof passing through the centers of the transparencies, means on said member for mounting said elements for pivotal movement relative to said base and about said centers the upper ends of said optical axes being angularly adjustable with respect to said centers, and means for adjusting said image-forming elements whereby to adjust said optical axis to suit the spacing of the eyes of an observer.

CHARLES W. PETERSON.